(12) United States Patent
Easttom, II (10) Patent No.: US 9,984,229 B1
(45) Date of Patent: May 29, 2018

(54) METHOD AND APPARATUS PROVIDING A MULTIPLE SOURCE EVIDENCE APPLICATION TRUST MODEL

(75) Inventor: William Charles Easttom, II, McKinney, TX (US)

(73) Assignee: Open Invention Network LLC, Durham, NC (US)

( * ) Notice: Subject to any disclaimer, the term of this patent is extended or adjusted under 35 U.S.C. 154(b) by 604 days.

(21) Appl. No.: 13/222,784

(22) Filed: Aug. 31, 2011

Related U.S. Application Data (60) Provisional application No. 61/379,078, filed on Sep. 1, 2010.

(51) Int. Cl.
*H04L 29/00* (2006.01)
*G06F 21/51* (2013.01)

(52) U.S. Cl.
CPC .................................. *G06F 21/51* (2013.01)

(58) Field of Classification Search
CPC ........ G06F 21/10; G06F 21/57; G06F 21/123; G06F 21/445; G06F 21/51–21/53
USPC ...................... 726/27, 22; 713/156
See application file for complete search history.

(56) References Cited

U.S. PATENT DOCUMENTS

| | | | |
|---|---|---|---|
| 6,430,561 B1 * | 8/2002 | Austel | G06F 21/6218 |
| 7,051,366 B1 | 5/2006 | LaMacchia et al. | |
| 7,131,143 B1 | 10/2006 | LaMacchia et al. | |
| 7,284,124 B1 * | 10/2007 | Ginsberg | G06F 21/53 |
| | | | 713/164 |
| 7,461,249 B1 * | 12/2008 | Pearson et al. | 713/156 |
| 7,634,807 B2 * | 12/2009 | Yan et al. | 726/22 |
| 7,774,620 B1 * | 8/2010 | Stott | G06F 21/51 |
| | | | 380/59 |
| 2004/0148514 A1 | 7/2004 | Fee | |
| 2005/0210285 A1 * | 9/2005 | Williams | G06F 17/30867 |
| | | | 726/5 |
| 2006/0090192 A1 | 4/2006 | Corby | |
| 2010/0077445 A1 * | 3/2010 | Schneider | G06F 21/52 |
| | | | 726/1 |
| 2010/0115625 A1 * | 5/2010 | Proudler | 726/27 |

OTHER PUBLICATIONS

Weboptimser, "Researchers develop image-based search engine", Apr. 14, 2004.
Tada, Masahiro, et al., "Similarity Image Retrieval System Using Hierarchical Classification", Springer-Verlag, Berlin, Heidelberg, 2002.
PR Newswire, "Ereo Introduces Industry's First Image-based Search Engine that Allows Search by Pictures and Other Rich Media", PR Newswire, Nov. 13, 2000.
netdaily.org, "VizSeek the Image Based Search Engine", NetDaily.org, 2008.

* cited by examiner

*Primary Examiner* — Noura Zoubair
(74) *Attorney, Agent, or Firm* — Haynes and Boone, LLP (57) ABSTRACT

Disclosed are examples of authorizing an application access attempt. One example method may include connecting via a computing device to at least one remote computing device at a remote site and attempting to download an application from the remote site. The method may also include determining via a processor a trust level of the application based on trust metrics and comparing the trust level to a predetermined threshold. The method may also include determining whether to allow the application to be downloaded to the computing device based on results of the comparing operation.

17 Claims, 7 Drawing Sheets

METHOD AND APPARATUS PROVIDING A MULTIPLE SOURCE EVIDENCE APPLICATION TRUST MODEL

CROSS REFERENCE TO RELATED APPLICATIONS

This application claims benefit to provisional application No. 61/379,078, entitled "MULTIPLE SOURCE EVIDENCE APPLICATION TRUST MODEL", filed on Sep. 1, 2010, the entire contents of which are hereby incorporated by reference.

TECHNICAL FIELD OF THE INVENTION

This invention relates to a method and apparatus of implementing a trust model for confirming certain applications are trustworthy prior to installing, accessing and/or utilizing the applications.

BACKGROUND OF THE INVENTION

Knowing whether to trust a software application prior to execution is a challenging task. There are endless viruses, bugs, worms, and other malicious software programs in existence today infecting computers on a daily basis. Most attacks are ones that could be prevented by an application screening program and/or the user's cooperation not to access an untrustworthy source of applications. There is no one type of virus protection software that is used to eliminate such an ongoing problem.

Trust level authorization, policy manager permissions, trusted sources, etc., are commonly used as guidelines to accept software applications prior to executing those applications on an end user's computer. Generally, these conventional trust guidelines employ a single source of trust establishment. However, there may be multiple different ways available to verify and confirm the legitimacy and integrity of an application source based on multiple policy models.

SUMMARY OF THE INVENTION

An example embodiment may provide a method that includes connecting via a computing device to at least one remote computing device at a remote site, attempting to download an application from the remote site, determining via a processor a trust level of the application based on a plurality of trust metrics and comparing the trust level to a predetermined threshold. The method may also include determining whether to allow the application to be downloaded to the computing device based on results of the comparing operation.

Another example embodiment may provide an apparatus including a transmitter configured to connect to at least one remote computing device at a remote site. The apparatus may also include a processor configured to attempt to download an application from the remote site, determine a trust level of the application based on a plurality of trust metrics, compare the trust level to a predetermined threshold, and determine whether to allow the application to be downloaded based on results of the comparing operation.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

For a computer-based system to rely on evidence to establish trust levels for an application, the system must consider multiple lines or sources of evidence, rather than simply one type of evidence. Similar to a criminal investigation, evidence may arise out of multiple different circumstances, witnesses and places. The legal system, in turn, must consider all the evidence prior to convicting a person of a crime. However, a single reliable alibi can exonerate a criminal suspect.

According to example embodiments of the present invention, a multiple source evidence application trust model is employed, which applies a different philosophy from the one adopted by the legal system of the United States. For instance, multiple sources or "lines" of trust are required to establish that the application is 'innocent' or safe for the end user to access and use. Even one negative piece of evidence may designate the application as "guilty" or unsafe to download. The principle is summarized as guilty until proven innocent. In this system, all applications are presumed to be guilty or malicious until their integrity can be proven as useful and not harmful to an end user's computing device (e.g., computer, smartphone, table computing device, cellular phone, handheld device, laptop, PC, etc.).

In determining what would be considered evidence of a downloaded application's safety and integrity, an application safety determination (ASD) procedure or application may be implemented based on a plurality of different items for consideration. For instance, one consideration may include determining whether the document is digitally signed. Applications that are digitally signed with a certificate from a known and trusted certificate authority would have positive evidence of safety. Another consideration may include determining whether the application is a trusted URL/IP-type of application. Such applications that are downloaded from a trusted URL and/or IP address would have evidence of safety. This could be determined by a trusted site list from one's browser, or in another example, the trust screen may be provided from a separate trust list. The rationale is that if a particular site is trusted, then it would seem likely that applications and downloads from that site should also be trusted.

Further considerations for trustworthiness may include determining whether applications are within a local domain, such as applications downloaded from a site within one's own network domain. This trust metric would be considered to provide evidence of safety. The rationale is that applications already on one's organization or network are more likely to be safe. Also, determining whether applications have been previously downloaded safely without error from a given site or IP address may be considered evidence of safety. The rationale is that if previous applications have been safely downloaded from a particular site, then current applications from that site are more likely to be safe.

Another example of evidence safety or a trust metric may include determining whether a source site is a reputable site. Downloading applications from well known sites would be considered evidence of safety. Such sites would include '.gov' sites as well as major company '.com' sites, such as Dell, Microsoft, Sun, Oracle. Those sites frequently offer applications, such as software add-ons, functions, drivers, plug-ins, patches, updates, etc. The rationale is that such sites are unlikely to be distributing malware and have already taken active measures to ensure the safety of their own data content.

In general, an operating system of a computing device needs to be capable of determining if a given application, particularly one being downloaded, should be trusted prior to installation. Security measures, such as digital signatures/certificates or application manifest files are commonly used. These security measures alone are incomplete, because they depend either on the vendor paying for a digital certificate or accurately representing their program in the manifest file. It can be assumed that a distributor of malware would provide inaccurate manifest information to trick those who are unable to confirm its validity.

One way to provide added security involves multiple lines of evidence before making a comprehensive decision to trust a site and/or an application. Other evidence trust metrics could be added as sources of evidence as determined by the user implementing such an ASD application. One could evaluate the evidence based on diverse strategies. In one example, the network administrator may establish a minimum point requirement, similar to matching finger prints (i.e., an 8 or 10 point match). In such an implementation, a minimum number of evidence pieces would be required in order to label an application as being safe. For example, in a 3-point system any application that had 3 items of evidence establishing its safety would be designated as safe prior to the user downloading and/or executing the application.

Figure 1:
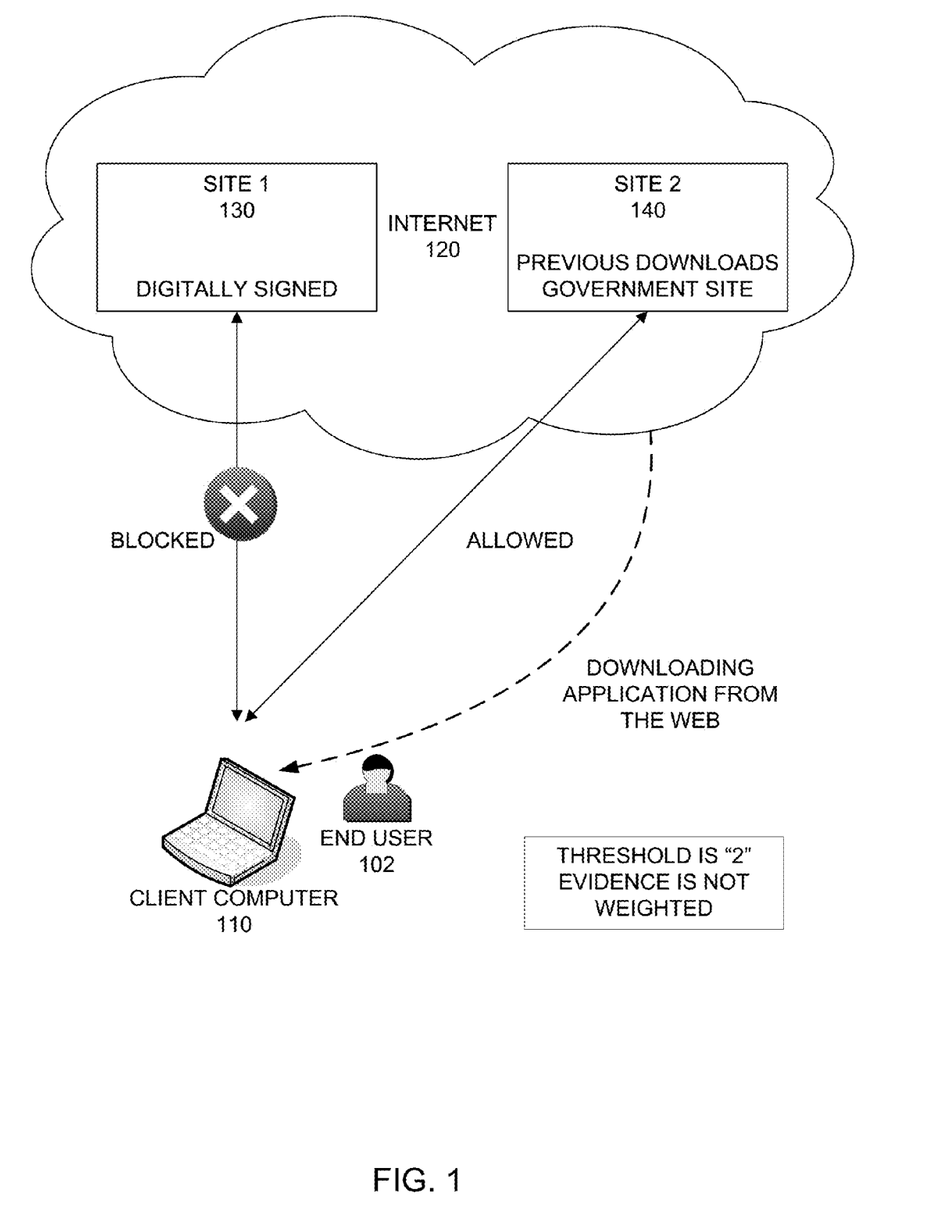
FIG. 1 illustrates an example communication network demonstrating a non-weighted download model according to example embodiments of the present invention.

FIG. 1 illustrates an example communication network demonstrating a non-weighted download model according to example embodiments of the present invention. Referring to FIG. 1, a client computer 110 is a machine operated by an end user 102 who accesses and downloads applications from the Internet 120. According to one example, a first site or website 130 may offer a digital certificate that is digitally signed in accordance with an application being accessed. This security metric may be identified automatically and assigned a weight equal to one (i.e., 1 point). A second site 140 may provide a history of being a previously downloaded site (i.e., 1 point) and may also be a government site (i.e., 1 point).

The combination of metrics would offer a positive safety score of 2 points based on the two safety metrics being present, and each being worth one point. As a result, the ASD safety application operating on the user's computer 110 may perform the point determination and calculations by identifying the various safety metrics and comparing their presence to a point system or table stored in the ASD safety application contents. For example purposes, each safety metric will be awarded a default value of 1 point, however, it may be appreciated that certain metrics are more important than others and thus are worth more points than others.

Referring to FIG. 1, various types of evidence may be weighed during an application screening process. For example, having a digital signature might provide more weight (i.e., 2 times the normal default weight value of "1" or a variable "W") than simply having downloaded an application from a previously known site. The total weights of evidence would be accumulated and added-up as points. As a result, the application would be deemed either safe or unsafe. For example, if digital certificates have a weight of "2" points (2 times a standard weight "W"), within domain file transfers have a weight of "3" points, and all other types of evidence have a weight of "1" point, then those applicable weights would be summed. The resulting calculated weight value (CWV) would be compared to a predetermined threshold weight value $T_W$, and if the calculated weight value was greater than or equal to the predetermined threshold weight (PTW), (i.e., CWV>=$T_W$) then the application would be considered safe for download.

Figure 2:
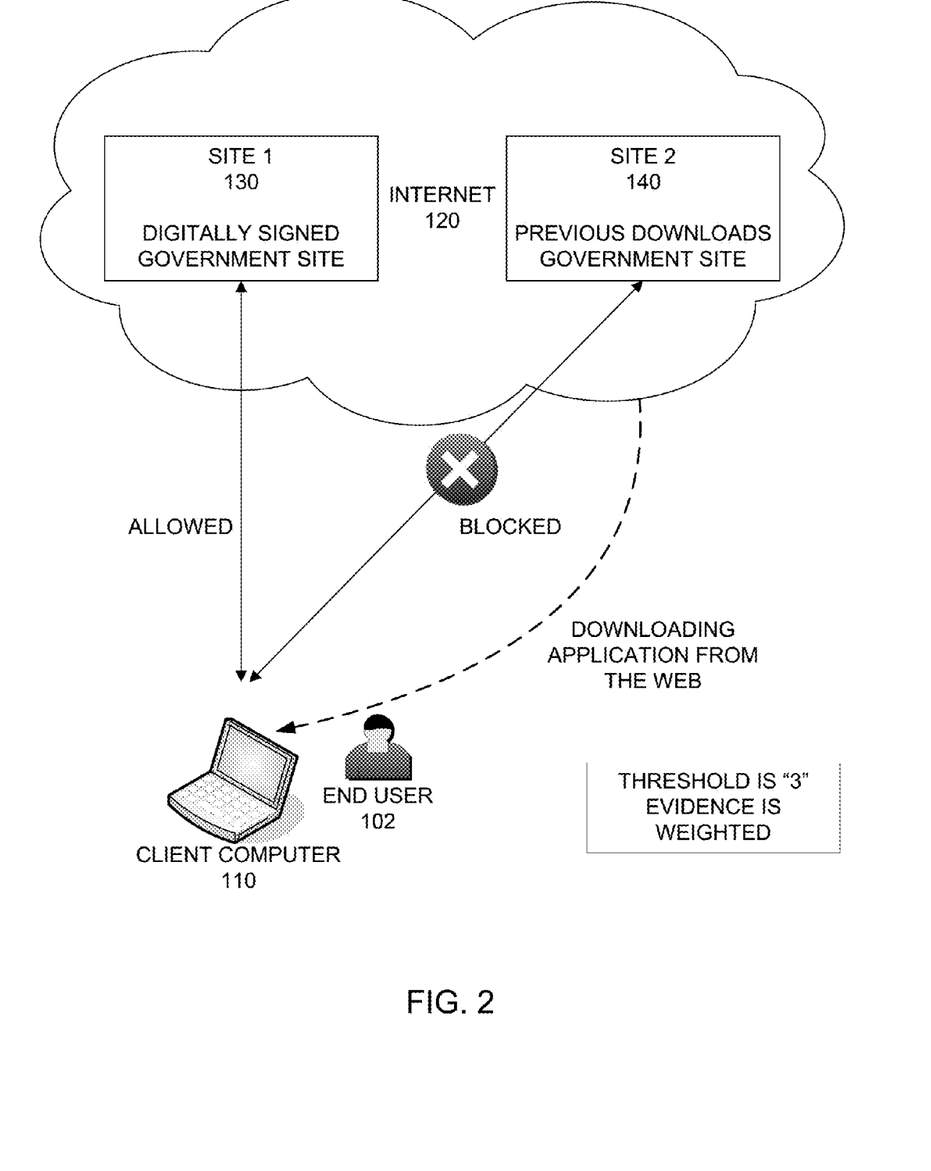
FIG. 2 illustrates an example communication network demonstrating a weighted download model according to example embodiments of the present invention.

According to another example, the PTW ($T_W$) may be set at a value of "3", as illustrated in FIG. 2. One application is attempted to be downloaded from a first site 130 that provides a digital certificate and which is a government site for a combined weight of 3 points. In this example, the digital certificate has a weight of 2 points and the government site has a weight of 1 to yield a total weight of 3 points which is equal to the predetermined PTW. The other application attempting to be downloaded from a second site 140 provides a previously used site and a government site—both of which are valued at 1 point each. However, the combined weight for site 140 would only yield a value of 2 points, which is less than the PTW of 3. As a result, the download would not be allowed from site 140 in the example illustrated in FIG. 2.

In another embodiment of this invention one could further adjust the permissions of an application based on a level of trust. Rather than simply having a 'trust' or 'untrusted' designation one could have partial trusts. For example, if one's threshold evidence level (PTW) is set at 3 and the application site yields a value of three then that site and/or application may be designated as having a partial trust or may only be granted limited rights. However, if one's threshold evidence level is 3 and the application is valued at 5 points one might grant that application and/or site more extensive rights or a full trust status.

Figure 3:
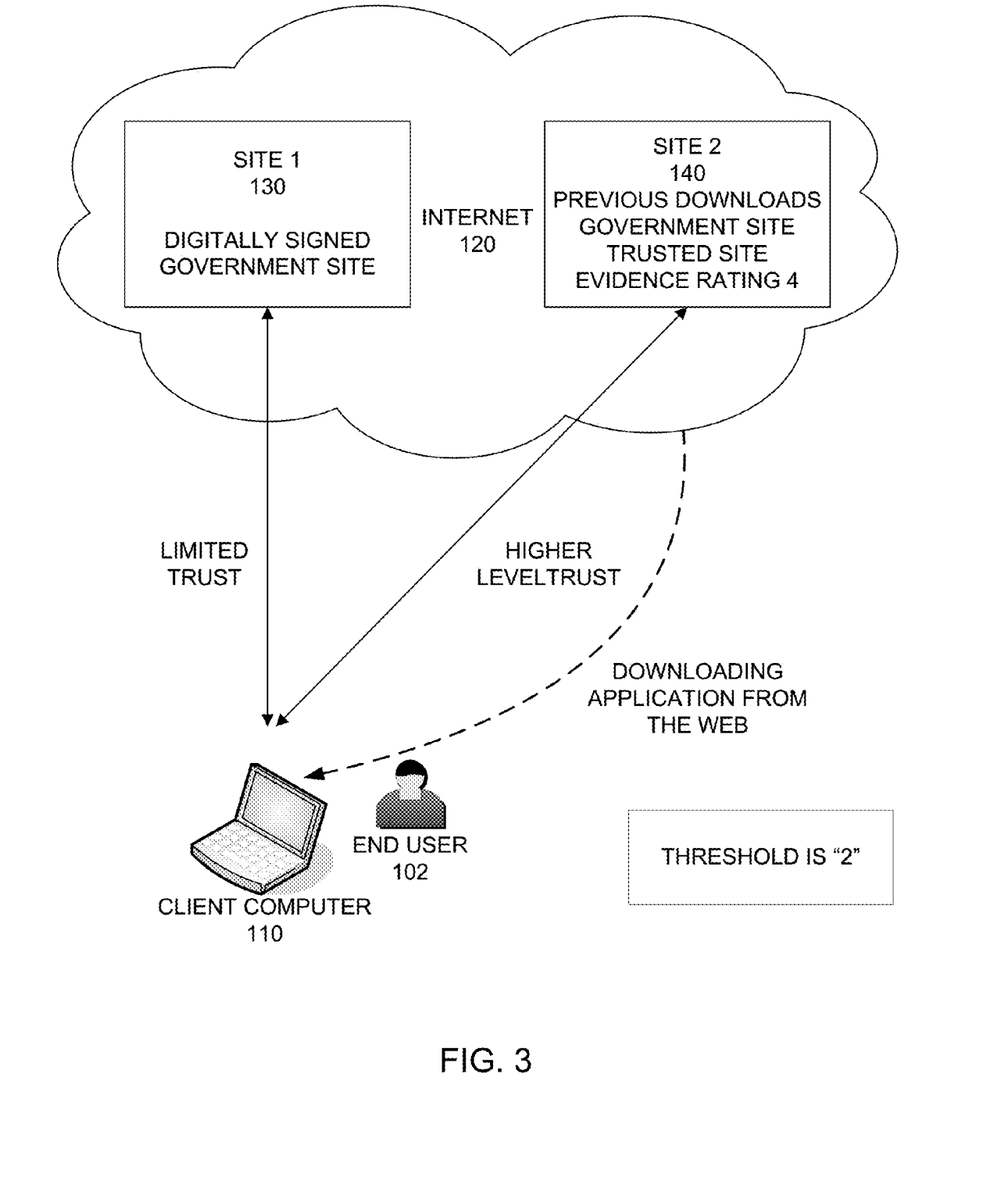
FIG. 3 illustrates an example communication network demonstrating limited or partial trust model according to example embodiments of the present invention.

FIG. 3 illustrates an example communication network demonstrating a limited or partial trust model according to example embodiments of the present invention. Partial trust may be defined by the application itself. For example, in a Windows® environment one might grant an application the following trust levels: guest access (i.e., equivalent to a guest user), user access (i.e., equivalent to a standard user), special user access (i.e., equivalent to a power user, backup operator, etc.), and administrator (i.e., equivalent to an administrator with full rights).

In another embodiment one could grant the application trust based on specific permissions, such as: execute only (the application can execute but cannot read or write any files, access the operating system, nor access system files), execute and read (the application can execute and can read in files but cannot write any files, access the operating system, nor access system files), read and write (the application can execute, read, and write but cannot access the operating system, nor access system files), limited system (the application can execute, read, write, and access limited system files such as writing to logs or using services, but cannot access other system files), and system access (the application can execute, read, write, access system files, etc.).

In another embodiment, the system could be augmented by having a contrary or negative evidence list. For example, certain negative evidence values may include viruses that have previously been found on that site, the site is marked as possibly hazardous by browser or antivirus software, and the site is new (i.e., the domain was registered recently—often phishing and spyware sites are newly created and maintained for brief periods of time).

The list of negative evidence could be longer. The above-noted examples are simply examples of a negative list based on the most common types of negative sites and application related problems. The ASD application operating on the user's computing device could then either block all downloads from a site with any negative evidence, or simply reduce the evidence score based on negative evidence. This could be done by simply reducing the score by one for each negative item found, according to an unweighted scoring scheme.

Figure 4:
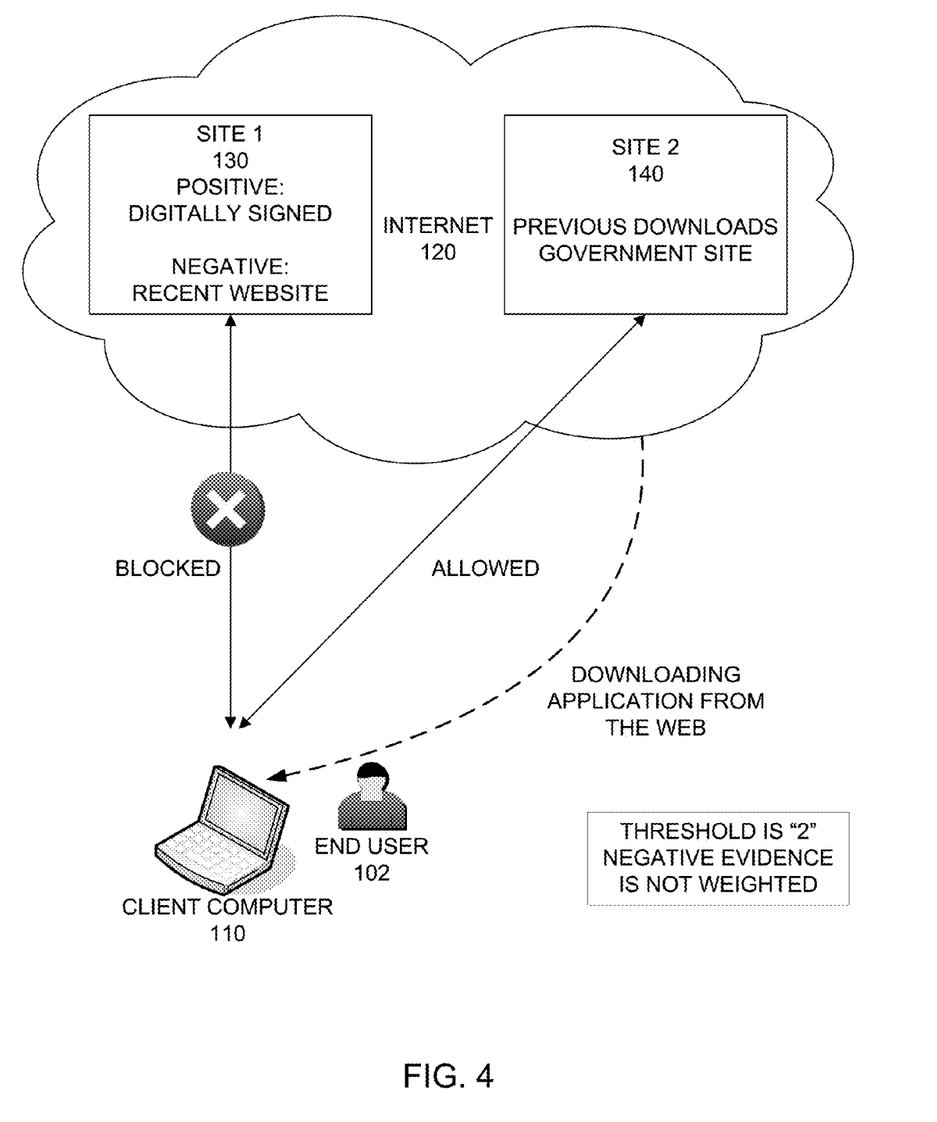
FIG. 4 illustrates an example communication network demonstrating an non-weighted negative evidence model according to example embodiments of the present invention.

FIG. 4 illustrates an example communication network demonstrating an unweighted negative evidence model according to example embodiments of the present invention. Referring to FIG. 4, a predetermined threshold PTW of 2 is established. The first site 130 has negative and positive metrics that are detected by the ASD safety application. In this case, the digital certificate at site 130 provides 2 positive points, however, an unweighted single negative point is deducted from the total points since the website is determined to be relatively new, increasing the likelihood that it is unsafe. As a result, the application is blocked from site 130 since the total points are only equal to 1. As for the second site 140, there are two simple metrics, previous downloads were confirmed and the site is a government site. The total points for site 140 are equal to the threshold of 2 which allows the application to be downloaded.

Figure 5:
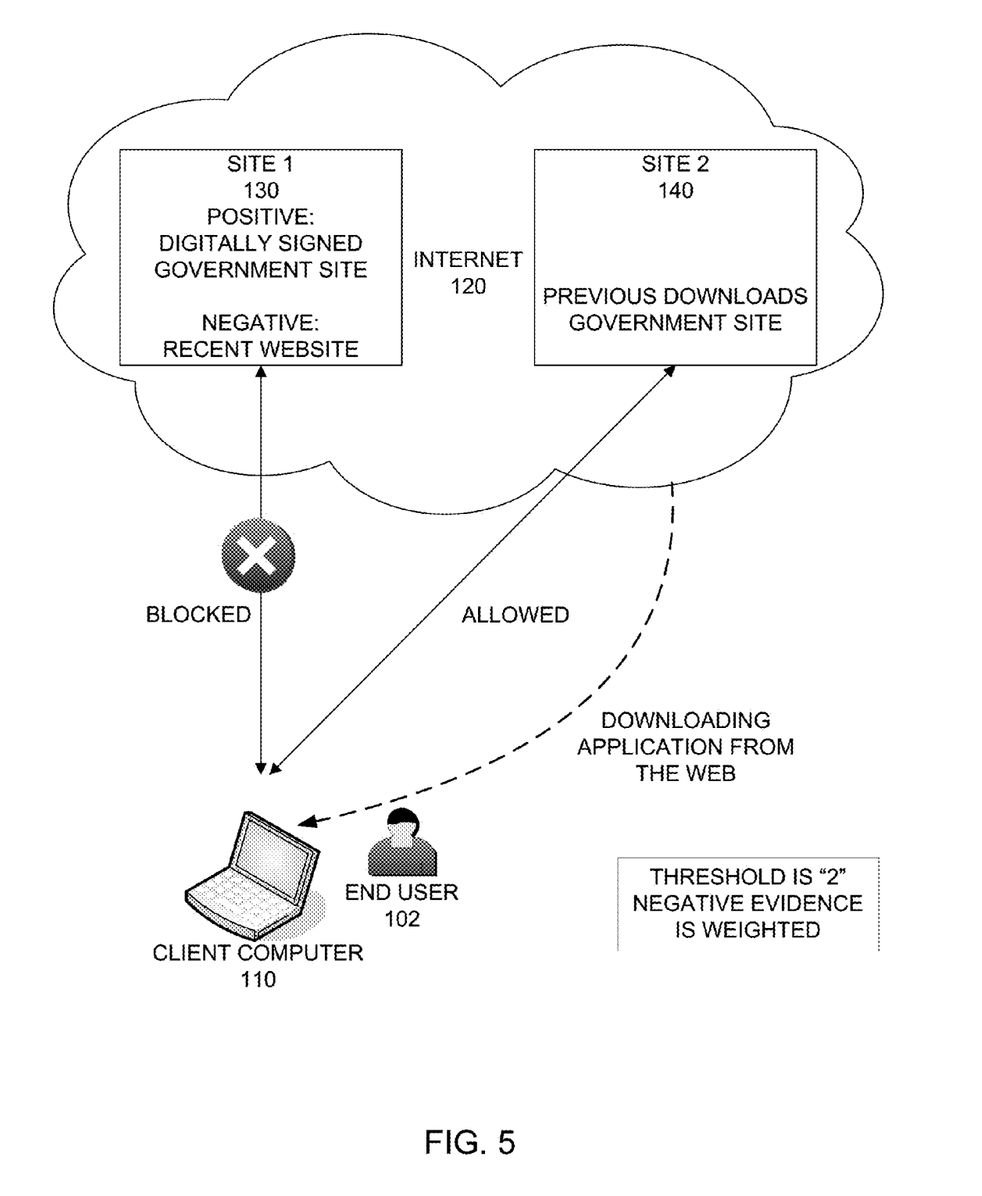
FIG. 5 illustrates a weighted negative evidence model according to example embodiments of the present invention.

FIG. 5 illustrates a weighted negative evidence model according to example embodiments of the present invention. It could also be the case that certain negative evidence (as with positive evidence) could be weighted to indicate a level of severity. For instance, the first site 130 may have ample positive metrics, such as a digitally signed certificate or 2 points and a government site of 1 point totaling 3 points. However, in this example the negative attribute of a recently created website may be weighed as a 2 point negative metric which equals a total of 1 point for site 130 (3−2=1). As a result, the application downloading will be blocked from the client computer 110. For the second site 140, the positive metrics of being a previously downloaded web site and a government site will yield a result of 2 total points (1 point for previous downloads+1 point for a government site).

Figure 6:
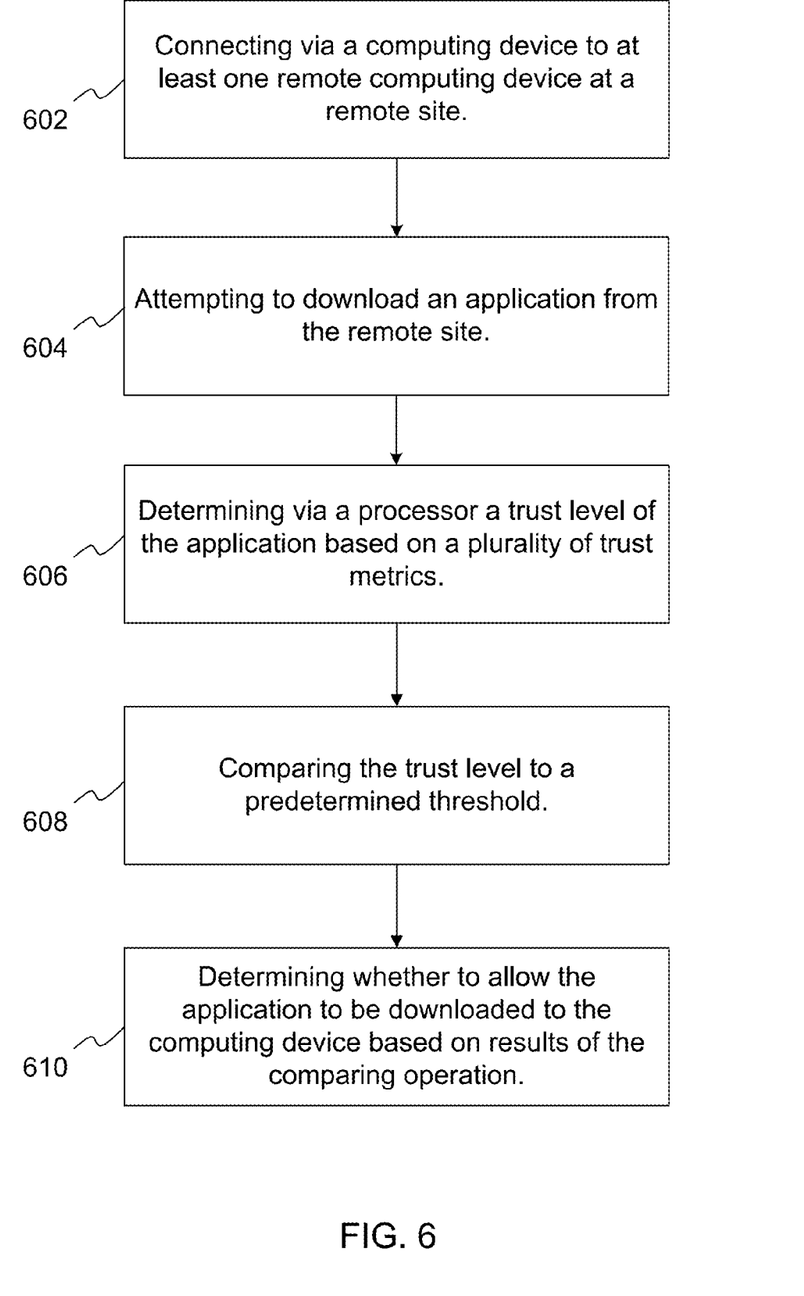
FIG. 6 illustrates a flow diagram according to example embodiments of the present invention.

FIG. 6 illustrates an example method of operation according to example embodiments of the present invention. Referring to FIG. 6, the method may include connecting via a computing device to at least one remote computing device at a remote site at operation 602. The method may also include attempting to download an application from the remote site at operation 604, determining via a processor a trust level of the application based on a plurality of trust metrics at operation 606, comparing the trust level to a predetermined threshold, at operation 608 and determining whether to allow the application to be downloaded to the computing device based on results of the comparing operation at operation 610

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary non-transitory storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components of the other figures.

Figure 7:
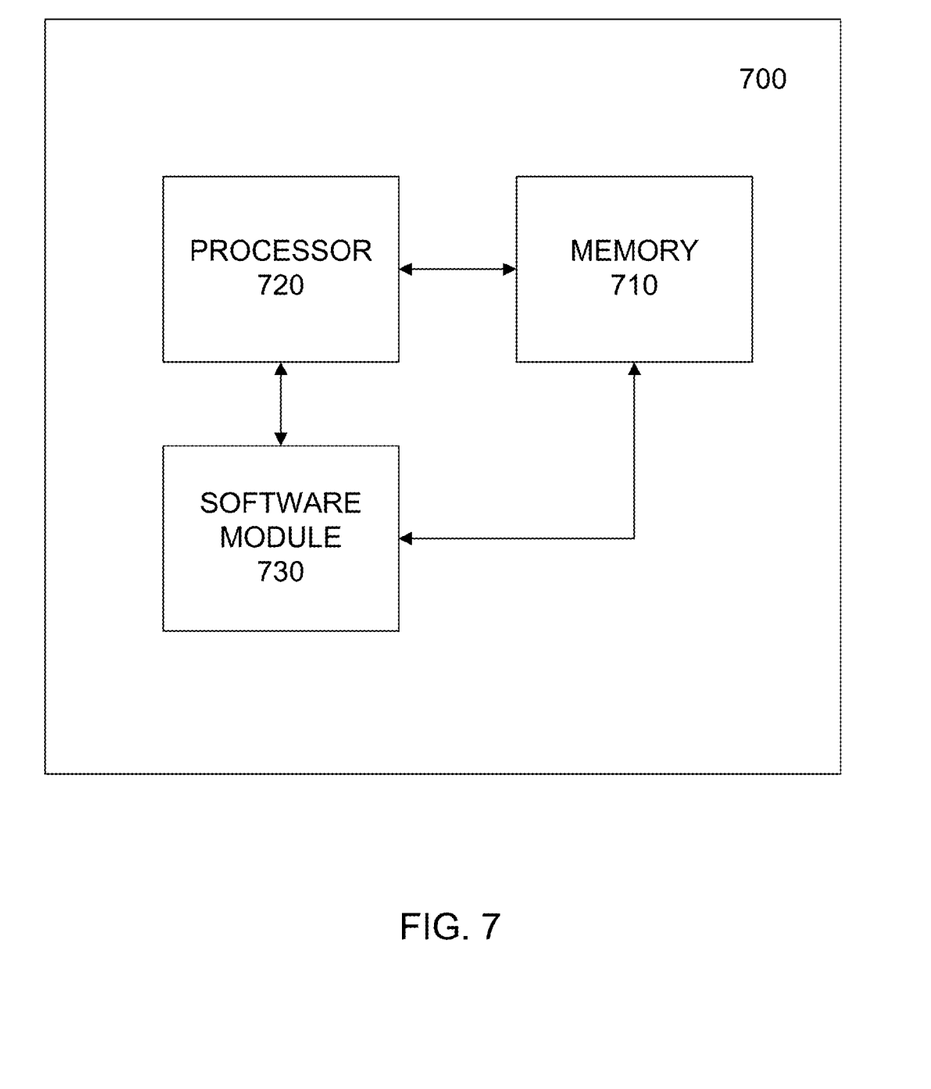
FIG. 7 illustrates a network entity that may include memory, software code and other computer processing hardware, and which may be configured to perform operations according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    connecting via a computing device to at least one remote computing device at a remote site;
    attempting to download an application from the remote site;
    determining via a processor a trust level associated with the application based on a plurality of trust metrics comprising a digital certificate site trust metric associated with the remote site providing the application, at least one site location trust metric, and at least one previous site history trust metric;
    assigning positive and negative weights to the plurality of trust metrics, wherein positive and negative weights indicate a level of severity of a corresponding metric;
    calculating the trust level of the application by summing point values for each of the plurality of trust metrics weighted by the assigned positive and negative weights, and wherein the digital certificate site trust metric has at least twice the weight assigned to at least one other of the plurality of trust metrics;
    assigning the trust level to the application;
    comparing the assigned trust level as a numeric point value based on points associated with each of the trust metrics to a predetermined threshold numeric point value;
    identifying the assigned trust level is equal to or less than the predetermined threshold point value;
    designating the remote site as having a partial trust level based on the numeric point value of the assigned trust level being compared to the predetermined threshold numeric point value and the identifying that the assigned trust level is equal to or less than the predetermined threshold point value;
    assigning the partial trust level to the application and, based on the assigned partial trust level, permitting the computing device to download the application and to perform one of: execute the application only,
        execute the application and read files associated with the application but not permitting the computing device to write files associated with the application or to access system files, and
        execute the application, read and write files associated with the application but not permitting the computing device to access system files.

2. The method of claim 1, wherein the remote site is a web site identified by a corresponding web address.

3. The method of claim 1, wherein the trust metrics comprise at least two of a digitally signed certificate, a government site, a site used for previous downloads, a trusted site, a local domain site, and a trust IP address and a reputable site.

4. The method of claim 3, further comprising:
    pairing the plurality of trust metrics that are applicable to the application based on a table of trust metric information stored at the computing device.

5. The method of claim 1, wherein comparing the trust level to a predetermined threshold further comprises determining when the trust level is greater than or equal to the predetermined threshold, and wherein determining whether to allow the application to be downloaded to the computing device based on the comparing operation further comprises allowing the application to be downloaded when the trust level is greater than or equal to the predetermined threshold.

6. The method of claim 1, further comprising: determining if any of the plurality of metrics are negative metrics and subtracting their respective point values from the summed total point value.

7. An apparatus, comprising:
    a transmitter configured to connect to at least one remote computing device at a remote site; and a processor configured to attempt to
        download an application from the remote site,
        determine a trust level associated with the application based on a plurality of trust metrics comprising a digital certificate site trust metric associated with the remote site providing the application, at least one site location trust metric1 and at least one previous site history trust metric,
    assign positive and negative weights to the plurality of trust metrics, wherein positive and negative weights indicate a level of severity of a corresponding metric;
    calculate the trust level of the application by summing point values for each of the plurality of trust metrics weighted by the assigned positive and negative weights, and wherein the digital certificate site trust metric has at least twice the weight assigned to at least one other of the plurality of trust metrics,
    assign the trust level to the application,
    compare the assigned trust level as a numeric point value based on points associated with each of the trust metrics to a predetermined threshold numeric point value,
    identify the assigned trust level is equal to or less than the predetermined threshold point value,
    designate the remote site as having a partial trust level based on the numeric point value of the assigned trust level being compared to the predetermined threshold numeric point value and the identification that the assigned trust level is equal to or less than the predetermined threshold point value,
    assign the partial trust level to the application and, based on the assigned partial trust level, permit the computing device to download the application and to perform one of: execute the application only,
        execute the application and read files associated with the application but not permit the computing device to write files associated with the application or to access system files, and
        execute the application, read and write files associated with the application but not permit the computing device to access system files.

8. The apparatus of claim 7, wherein the remote site is a web site identified by a corresponding web address.

9. The apparatus of claim 7, wherein the trust metrics comprise at least two of a digitally signed certificate, a government site, a site used for previous downloads, a trusted site, a local domain site, and a trust IP address and a reputable site.

10. The apparatus of claim 9, the processor is configured to pair the plurality of trust metrics that are applicable to the application based on a table of trust metric information stored in memory.

11. The apparatus of claim 7, wherein the processor is configured to compare the trust level to a predetermined threshold by determining when the trust level is greater than or equal to the predetermined threshold, and wherein the processor is configured to determine whether to allow the application to be downloaded to the computing device based on the comparison by allowing the application to be downloaded when the trust level is greater than or equal to the predetermined threshold.

12. The apparatus of claim 7, the processor is configured to determine if any of the plurality of metrics are negative metrics and subtracting their respective point values from the summed total point value.

13. A non-transitory computer readable storage medium configured to store instructions that when executed cause a processor to perform:
    connecting via a computing device to at least one remote computing device at a remote site;
    attempting to download an application from the remote site;
    determining via the processor a trust level associated with the application based on a plurality of trust metrics comprising a digital certificate site trust metric associated with a remote site providing the application, at least one site location trust metric, and at least one previous site history trust metric;
    assigning positive and negative weights to the plurality of trust metrics, wherein positive and negative weights indicate a level of severity of a corresponding metric;
    calculating the trust level of the application by summing point values for each of the plurality of trust metrics weighted by the assigned positive and negative weights, and wherein the digital certificate site trust metric has at least twice the weight assigned to at least one other of the plurality of trust metrics;
    assigning the trust level to the application;
    comparing the assigned trust level as a numeric point value based on points associated with each of the trust metrics to a predetermined threshold numeric point value;
    identifying the assigned trust level is equal to or less than the predetermined threshold point value;
    designating the remote site as having a partial trust level based on the numeric point value of the assigned trust level being compared to the predetermined threshold numeric point value and the identifying that the assigned trust level is equal to or less than the predetermined threshold point value;
    assigning the partial trust level to the application and, based on the assigned partial trust level, permitting the computing device to download the application and to perform one of: execute the application only,
        execute the application and read files associated with the application but not permitting the computing device to write files associated with the application or to access system files, and
        execute the application, read and write files associated with the application but not permitting the computing device to access system files.

14. The non-transitory computer readable storage medium of claim 13, wherein the remote site is a web site identified by a corresponding web address.

15. The non-transitory computer readable storage medium of claim 13, wherein the trust metrics comprise at least two of a digitally signed certificate, a government site, a site used for previous downloads, a trusted site, a local domain site, and a trust IP address and a reputable site.

16. The non-transitory computer readable storage medium of claim 15, wherein the processor is further configured to perform:
    pairing the plurality of trust metrics that are applicable to the application based on a table of trust metric information stored at the computing device.

17. The non-transitory computer readable storage medium of claim 13, wherein comparing the trust level to a predetermined threshold further comprises determining when the trust level is greater than or equal to the predetermined threshold, and wherein determining whether to allow the application to be downloaded to the computing device based on the comparing operation further comprises allowing the application to be downloaded when the trust level is greater than or equal to the predetermined threshold.

* * * * *